(No Model.)
2 Sheets—Sheet 1.
T. RODGER.
DUMPING CAR.
No. 374,006. Patented Nov. 29, 1887.
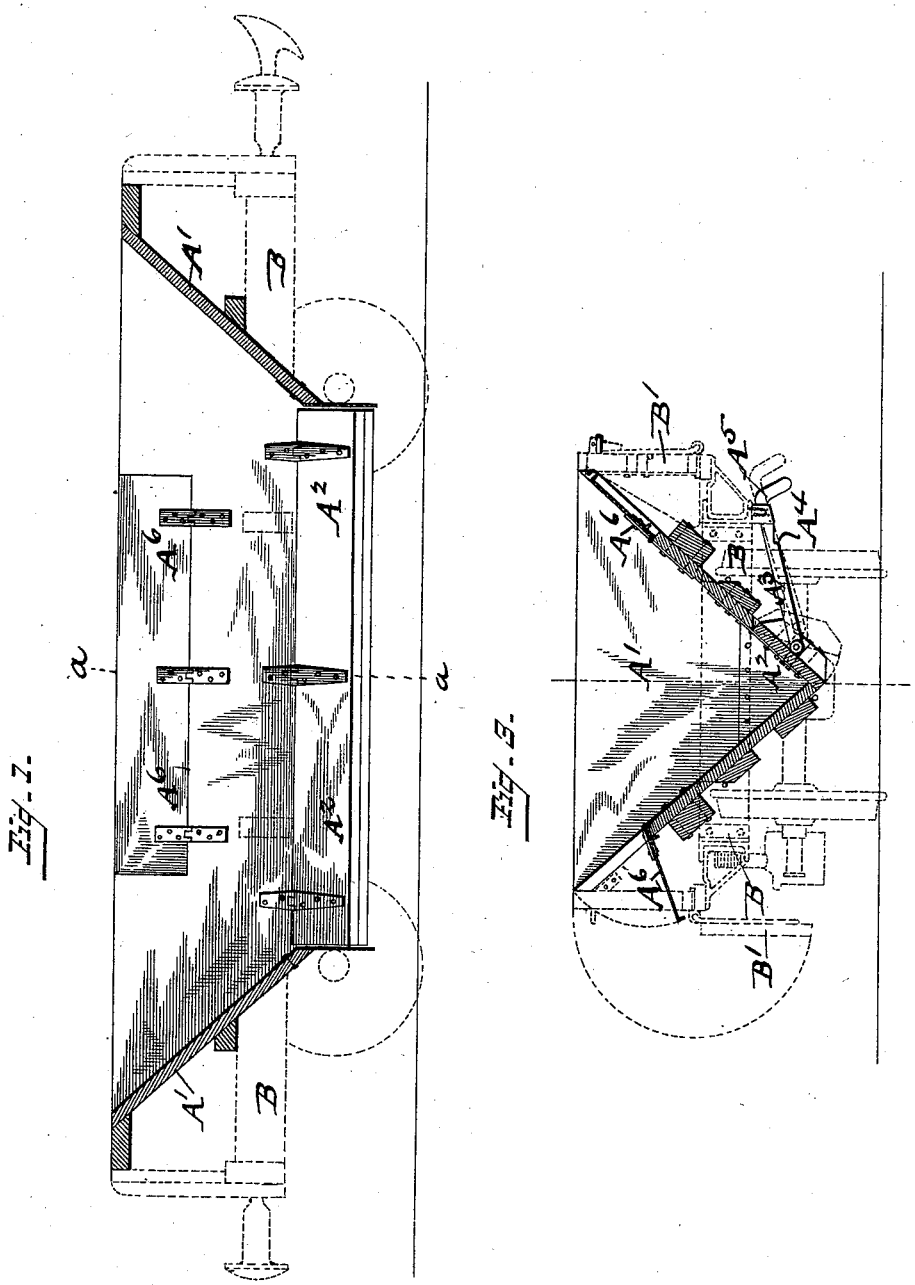
Witnesses
Wm. L. Sheiden
C. E. Jones
Inventor
Thomas Rodger,
By his Attorney
Chas. J. Gooch.

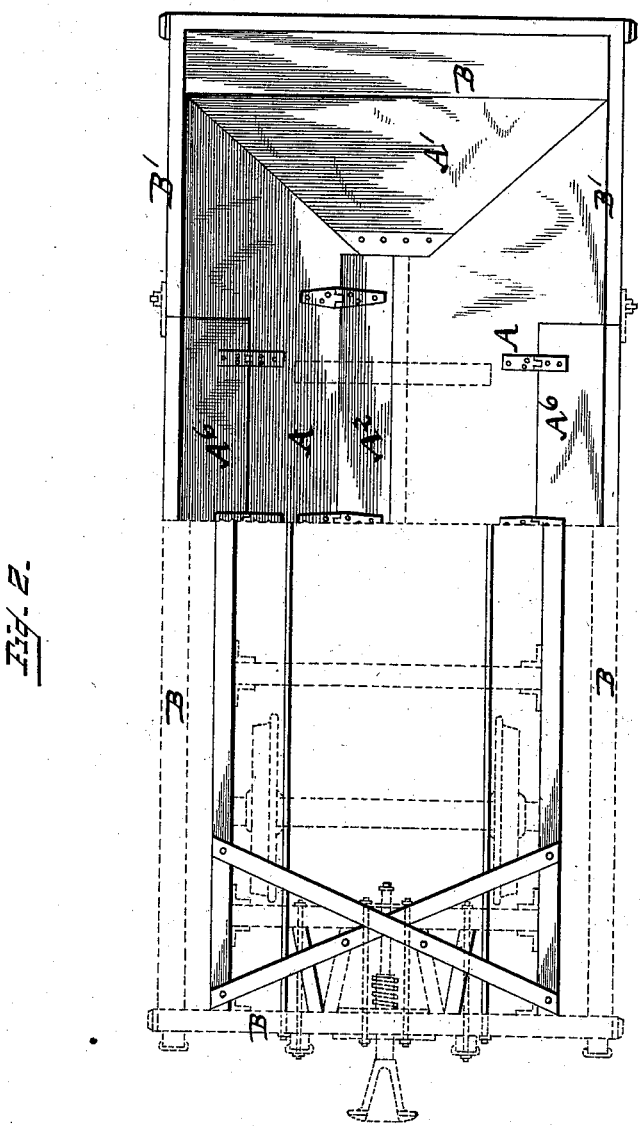

UNITED STATES PATENT OFFICE.

THOMAS RODGER, OF DUNEDIN, NEW ZEALAND, ASSIGNOR OF TWO-THIRDS TO THOMAS BLACK AND ROBERT CRAWFORD, BOTH OF SAME PLACE.

DUMPING-CAR.

SPECIFICATION forming part of Letters Patent No. 374,006, dated November 29, 1887.

Application filed May 24, 1886. Serial No. 203,132. (No model.) Patented in New Zealand January 6, 1886, No. 1,681.

*To all whom it may concern:*

Be it known that I, THOMAS RODGER, a subject of the Queen of Great Britain, residing at Dunedin, in the British Colony of New Zealand, engineer, have invented Improved Self-Emptying Hopper-Wagons for Ballasting on Railways, (for which an application for patent was filed in the British Colony of New Zealand on the 6th day of January, 1886, and numbered 1,681; that under the laws governing the grant of patents in said Colony the Letters Patent will bear date as of the day of filing, and that up to the present time the patent on said application filed in said Colony has not been granted,) of which the following is a specification.

The invention consists in fitting a hopper into an ordinary railway-wagon of such a construction that on opening the door of the hopper at the bottom the whole contents of the wagon will run out by gravitation, without the assistance of manual labor, and that this will take place gradually as the wagon is moved along by the locomotive of the ballast-train to which it is attached, leaving the ballast evenly boxed up a continuous heap between the rails, ready for spreading.

Figure 1 is a side elevation of the hopper-body mounted on the frame of an ordinary railway-truck, which is shown in dotted lines. Fig. 2 is a half-plan of the hopper mounted as above and a half-plan of the railway-truck, which is again shown in dotted lines. Fig. 3 is a transverse section on the line *a a*, Fig. 1.

In these figures, A are the inclined sides and A' the inclined ends of the hopper, which may be made wholly of iron, or of wood lined with sheet-iron, and mounted upon a suitable truck-frame, B. The lowermost part of one of the inclined sides is furnished with a hinged portion or door, $A^2$, controlled by lever $A^3$, having notches $A^4$ on its edge, fitting suitable projections in the catch-plate $A^5$, so as to form a lock to keep said door closed.

$A^6$ are the hinged openings or doors formed on the upper sides of the hopper, and these are, as shown, held up or locked in position by the ordinary hinged sides, B', of the truck.

The mode of operation is as follows: Supposing the hopper-wagons to have been filled with the material which is to form the ballast, then the train of trucks is drawn by the locomotive to the part of the line which is to be ballasted, where the speed of the engine is preferably slackened, and the lower door, $A^2$, and the side doors, $A^6$, are opened to allow the ballasting material to drop out along the line between and outside of the rails, delivering the material as the wagon is traveling and forming a ridge or heap which has afterward to be leveled down. It may be here remarked that the bottom of the hopper is brought sufficiently low to prevent any possibility of as much ballast falling out as would cover the space between the rails, and so not retain sufficient clearance for the wheels.

Having now particularly described and explained the nature of my said invention and in what manner the same is to be performed, I declare that what I claim is—

The combination, with a car or wagon having an opening in its bottom, of a hopper mounted in the framing of the vehicle and having inclined sides and ends, a door hinged to one of said sides, a notched lever attached to said door, and a catch-plate having projections thereon to engage the notches in the lever and hold said lever and door in the desired position, as and for the purposes set forth.

THOMAS RODGER.

Witnesses:
JOSEPH SOLOMON,
ANDREW SINCLAIR.